May 22, 1934.  W. B. GOFF ET AL  1,959,713

CLAMPING DEVICE

Filed July 18, 1933

Inventor
William B. Goff
Genaro F. Delgado
By Clarence A. O'Brien
Attorney

Patented May 22, 1934

1,959,713

UNITED STATES PATENT OFFICE 1,959,713

CLAMPING DEVICE

William Benjamin Goff and Genaro F. Delgado, Tucson, Ariz.

Application July 18, 1933, Serial No. 681,026

2 Claims. (Cl. 173—259)

This invention relates to a clamping device which may be used as a battery terminal or other electric terminal, or other terminal, the general object of the invention being to provide a pair of jaws and a sleeve carrying member threaded to the body of the jaws and provided with means whereby when the sleeve is moved in one direction, the jaws will be opened and when the sleeve is moved in another direction, the jaws will be closed.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
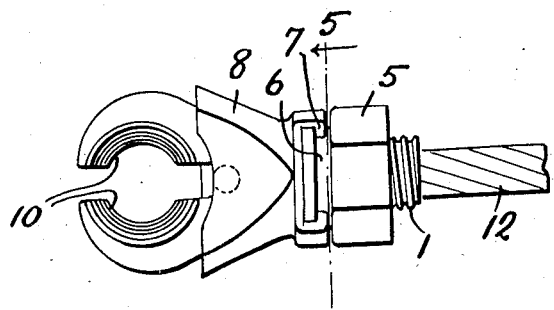
Figure 1 is a top plan view of the device, showing the jaws in partly closed position.
Figure 2:
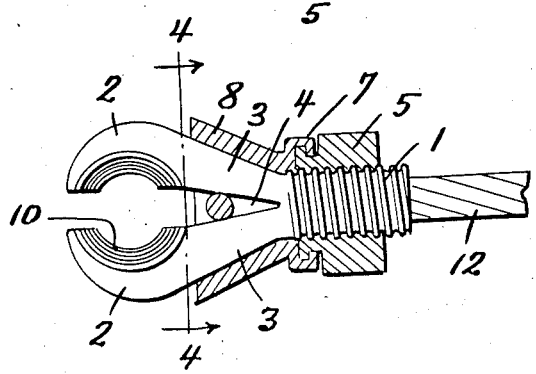
Figure 2 is a similar view, but showing the sleeve and nut in section.
Figure 5:
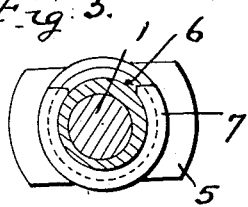
Figure 5 is a section on line 5—5 of Figure 1.
Figure 3:
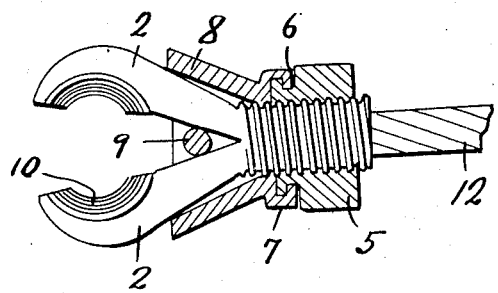
Figure 3 is a view similar to Figure 2, but showing the parts with the jaws in open position.
Figure 4:
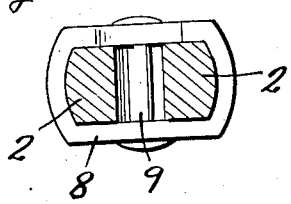
Figure 4 is a section on line 4—4 of Figure 2.

In this drawing, the numeral 1 indicates the body of the device which is threaded, as shown, and the numeral 2 indicates the pair of jaws which are formed with the body at one end thereof and in a manner to permit the jaws to move toward or away from each other. The shank 3 of each jaw is separated from the other shank by a substantially V-shaped recess 4.

A nut 5 is threaded on the body 1 and has an annular groove 6 therein for receiving the flange 7 of a substantially V-shaped sleeve 8, the sides and ends of which are closed and the sides of which are connected together by a pin 9 which passes through the recess 4.

Thus it will be seen that when the nut 5 is moved in one direction, the sleeve will also be moved and the pin 9 moves toward the free end of the jaws and portions of the sleeve engaging the outer edges of the shanks of the jaws will move the jaws toward each other so that the jaws follow the pin and this will cause the recessed portions 10 of the jaws to grip the battery post or other object placed between them. By moving the nut in an opposite direction, the pin 9 will be moved toward the closed end of the recess so that it will force the jaws apart and the movement of the sleeve toward the small ends of the shanks of the jaws will permit this outward movement of the jaws.

Figure 6:
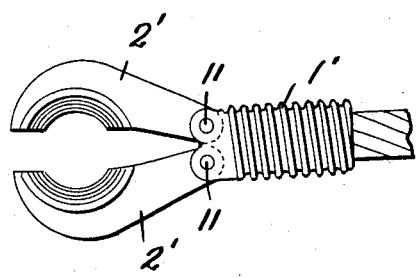
Figure 6 is a view showing a modification.

In the first form of the invention, the shanks of the jaws are yieldably connected with the body, but in the form shown in Figure 6, the jaws 2' are pivotally connected, as at 11, with the body 1', but in other respects this form of the invention is similar to that above described.

When the device is used as a battery post, or other terminal post or connection, the body 1 is formed with a pocket to receive an end of the cable 12, as shown in Figures 1, 2, 3 and 6.

Thus it will be seen that we have provided a simple clamping device, the jaws of which are moved to open and closed positions by the turning movement of the nut on the threaded body.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a threaded body of circular form in cross section, of pair of jaws movably connected to one end of the body, a nut threaded on the body and a substantially V-shaped sleeve rotatably connected with the nut and movable therewith, the diverging internal wall of the V-shaped sleeve engaging the outer edges of the jaws to force them together when the nut is moved in one direction and a pin connected with the sleeve and passing between the jaws for moving the jaws apart when the nut is moved in an opposite direction.

2. A device of the class described comprising a body of circular shape in cross section, and having spiral threads thereon, a nut threaded on the body and having an annular groove therein, a pair of jaws having tapered shanks movably connected to one end of the body at the small ends of said shanks, a substantially V-shaped sleeve having a flange fitting in the groove of the nut with the V-shaped part of the sleeve fitting over the shanks of the jaws and a pin connected with the sleeve and passing between the shanks of the jaws.

WILLIAM BENJAMIN GOFF.
GENARO F. DELGADO.